United States Patent [19]

Ernsberger et al.

[11] 4,223,259

[45] Sep. 16, 1980

[54] APPARATUS FOR SUPPORTING A BODY IN A DESIRED ANGULAR POSITION

[75] Inventors: Klaus Ernsberger, Friedrichshafen; Helmut Meier, Immenstaad, both of Fed. Rep. of Germany

[73] Assignee: Dornier System GmbH, Friedrichshafen, Fed. Rep. of Germany

[21] Appl. No.: 922,061

[22] Filed: Jul. 5, 1978

[30] Foreign Application Priority Data

Jul. 9, 1977 [DE] Fed. Rep. of Germany ....... 2731134

[51] Int. Cl.$^2$ .............................................. B64C 17/02

[52] U.S. Cl. ...................................... 318/648; 318/649

[58] Field of Search .................. 318/648, 649; 172/4.5

[56] References Cited

U.S. PATENT DOCUMENTS

| | | | |
|---|---|---|---|
| 2,883,594 | 4/1959 | Alberts | 318/648 |
| 3,271,650 | 9/1966 | Riddle | 318/648 |
| 3,534,327 | 10/1970 | Lukso | 318/648 X |
| 3,851,238 | 11/1974 | Fletcher | 318/649 |
| 3,988,659 | 10/1976 | Ambrosini | 318/648 |

*Primary Examiner*—B. Dobeck

*Attorney, Agent, or Firm*—Toren, McGeady and Stanger

[57] ABSTRACT

Apparatus for supporting a body on a carrier in a desired angular position while the carrier is mounted on a moving base, such as a ship, includes an electrically operated drive for angularly moving the carrier relative to the base about a normally horizontally extending axis. The control device for controlling the drive includes a first signal generator which senses the rate of angular movement of the carrier in a plane perpendicular to the afore-mentioned axis and generates a first signal indicative of the sensed rate. A second signal generator includes a mercury switch and generates a second, constant, D.C. signal indicative of the absence or presence of a predetermined angular position of the mercury switch in plane perpendicular to the axis. A circuit connected to the signal generators and the drive transmits to the drive an electrical operating signal in response to the first and second signals and thereby causes the mercury switch to be moved by the drive into its predetermined angular position.

5 Claims, 3 Drawing Figures

APPARATUS FOR SUPPORTING A BODY IN A DESIRED ANGULAR POSITION

This invention relates to apparatus for supporting a body in a desired angular position, and more particularly to apparatus for maintaining a desired angular position of a carrier for the body.

When cameras, transmitting and receiving antennas, and like bodies are supported on a vehicle and need to remain trained on a target while the vehicle moves, it is necessary to isolate the supported body from the movements of the vehicle, and in many cases to maintain a certain angular relationship for the body or supporting structure for the same and the direction of terrestrial gravitation.

Conventional apparatus for maintaining such a relationship with high accuracy usually employs gyroscopes. They are costly in their operation and maintenance and thus not desirable for maintaining a desired position of such devices as ship antennas for tracking navigation satellites which need to be operated continuously over extended periods.

A sensor system which does not require gyroscopes has been disclosed in U.S. Pat. No. 3,899,028. It employs angular and linear accelerometers cooperating with a special purpose computer, a relatively costly arrangement.

It is a primary object of this invention to provide apparatus of the type described which has a long useful life, may be assembled at low cost from commercially available components, yet operates at high accuracy.

In its more specific aspects, the invention provides apparatus for supporting a body in a desired position in which a base and a carrier for the body to be supported are operatively connected by an electrically operated drive. The drive may move the carrier angularly relative to the base about an axis extending horizontally in the normal operating position of the apparatus. The drive is controlled by two signal generators mounted on the carrier of which the first senses the rate of angular movement of the carrier in a plane perpendicular to the afore-mentioned axis and generates a first signal indicative of the sensed rate. The second signal generator includes a position-responsive switch and generates a second, constant, D.C. signal indicative of the presence or the absence of a predetermined angular position of the mercury switch relative to terrestrial gravitation in a plane perpendicular to the axis. Circuitry connected to the two signal generators and the drive transmits to the drive an electrical operating signal in response to the first and second signals for thereby moving the mercury switch into the predetermined angular position of the same.

Other features, additional objects, and many of the attendant advantages of this invention will readily be appreciated as the same becomes better understood by reference to the following detailed description of a preferred embodiment when considered in connection with the appended drawing in which.

Figure 1:
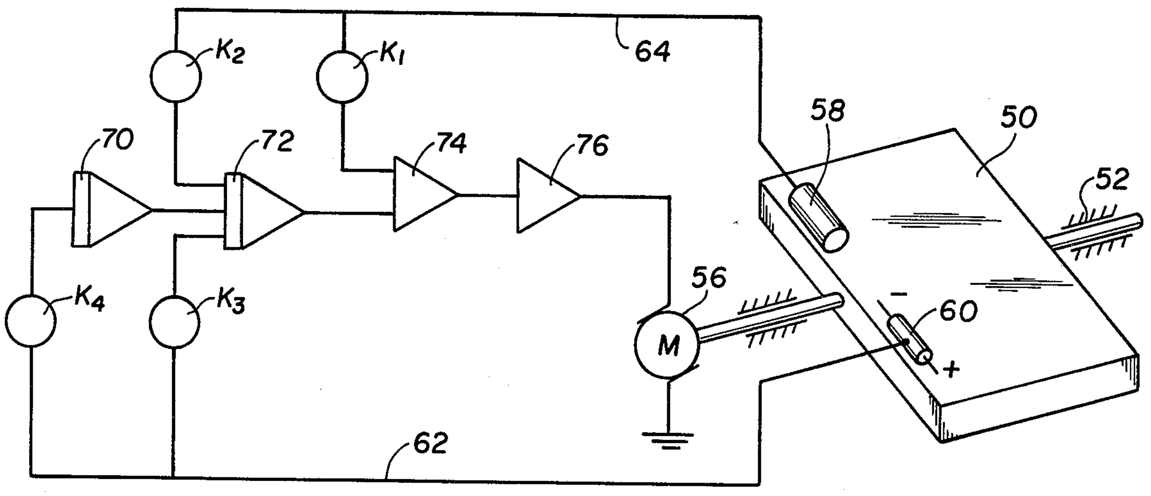
FIG. 1 illustrates a leveling unit of the invention partly in simplified perspective view, and partly by conventional symbols.

Referring initially to FIG. 1, there is shown a carrier 50 pivotally mounted on a base 52 by means of a shaft 54 which is directly coupled with the output shaft of a positioning motor 56. An angular rate sensor 58 and a single-pole double throw mercury switch 60 are mounted on the carrier 50 in a plane perpendicular to the axis of the shaft 54 in such a manner that the sensor 58 generates a signal in response to its angular movement in the plane, and the mercury switch yields no signal when horizontal and in the absence of acceleration in the plane, but produces a fixed positive or negative D.C. signal when the switch 60 is tilted clockwise or counter-clockwise respectively relative to the horizontal in the afore-mentioned plane.

A conductor 62 feeds the output signal of the switch 60 through an input adjusting circuit $K_4$, such as a potentiometer, to a first integrating network 70, and also through another input adjusting circuit $K_3$ to a second integrating network 72 which also receives the output signal of the rate sensor 58 through a conductor 64 and a further input adjusting circuit $K_2$ and the amplified output signal of the network 70. The amplified output signal of the second integrating network 72 is fed to the input of a summing amplifier 74 together with the output signal of the rate sensor 58 as modified by an input adjusting circuit $k_1$. A power amplifier 76 receives the output signal of the summing amplifier 74 and energizes the positioning motor 56.

The angular rate sensor 58, not shown in detail, is a staple article of commerce of a type disclosed and claimed in U.S. Pat. No. 3,500,691.

The energizing signal transmitted to the motor 56 is related to the output signal $V_{58}$ of the sensor 58 and the output signal $V_{60}$ of the mercury switch 60 by the following equation:

$$V_{76} = k_1V_{58} + k_2 \int V_{58}dt + k_3 \int V_{60}dt + k_4 \int \int V_{60}dt\, dt$$
$$= k_1V_{58} + \int (k_2V_{58} + k_3V_{60} + \int k_4V_{60}dt)\, dt$$

In this equation, $k_1$ and $k_2$ are constant factors adjusted by means of the circuits $K_1$ and $K_2$ to set the effects of the sensed angular rate on the control signal $V_{76}$. The constants $k_3,k_4$ similarly set by means of the circuits $K_3,K_4$ minimize the effects of translatory acceleration on the output signal of the mercury switch 60. Offset values in the sensed angular rate do not cause lasting offsets of the carrier 20 because of the double integration of the signal $V_{60}$.

The motor 56 turns the carrier 50 to keep the mercury switch 60 in a horizontal position, and thereby to keep the carrier 50 in a desired position relative to the afore-mentioned plane of movement regardless of any tilting movement of the base 52 in that plane. While a single set of a sensor 58 and a switch 60 may be sufficient in some applications, two or more sets may be needed for holding a camera, a tracking antenna, or the like in a fixed angular relationship to terrestrial gravity if the base 52 is a vehicle, as will presently be described with reference to FIGS. 2 and 3.

Because of the non-linear characteristics of the mercury switch 60, the carrier 50 is caused to oscillate periodically about a horizontal position even while the base 52 is stationary. The amplitude and frequency of such oscillations can be held within limits consistent with permissible tolerances by suitably adjusting the circuits $K_1$ to $K_4$.

Leveling units of the type described above have been used successfully in a ship-borne radar antenna mounting for tracking navigation satellite. The antenna arrangement illustrated in FIG. 2 has been disclosed in more detail in the commonly owned, copending application Ser. No. 861,290 filed Dec. 16, 1977.

A radome 2 is mounted on a base 4 fixedly fastened to a ship of which only the top of a mast 6 is seen in the drawing. Access to the interior of the radome 4 may be had by means of a ladder 10 and a trap door 12 in the base 4. A fixed extension 14 of the mast 6 under the radome 2 carries a bearing fork 16 in which one shaft 17 of a cross-shaped pivot member 18 is journaled. The other shaft 19, perpendicular to the shaft 17, is journaled in an antenna carrier 26. Depending leg portions 28, 30 of the carrier are weighted by means of a sensor assembly in a housing 32 and a counterweight 34 to bias lugs 38 on the carrier 26 into a vertical position. A parabolic radar antenna 20 is journaled in the lugs 38 by means of a shaft 40, and the antenna 20 may be aimed at a navigation satellite in any portion of the sky by means of positioning motors 36, 44 respectively turning the shafts 19, 40 in accordance with control signals received from a radar transmitting and receiving unit mounted in a casing 42 on the antenna 20. A motor 22 and a gear train partly seen at 24 permit the carrier 26 to be tilted about the axis of the shaft 17 to compensate for rolling of the ship whose normal direction of travel is parallel to the shaft 17.

Figure 3:
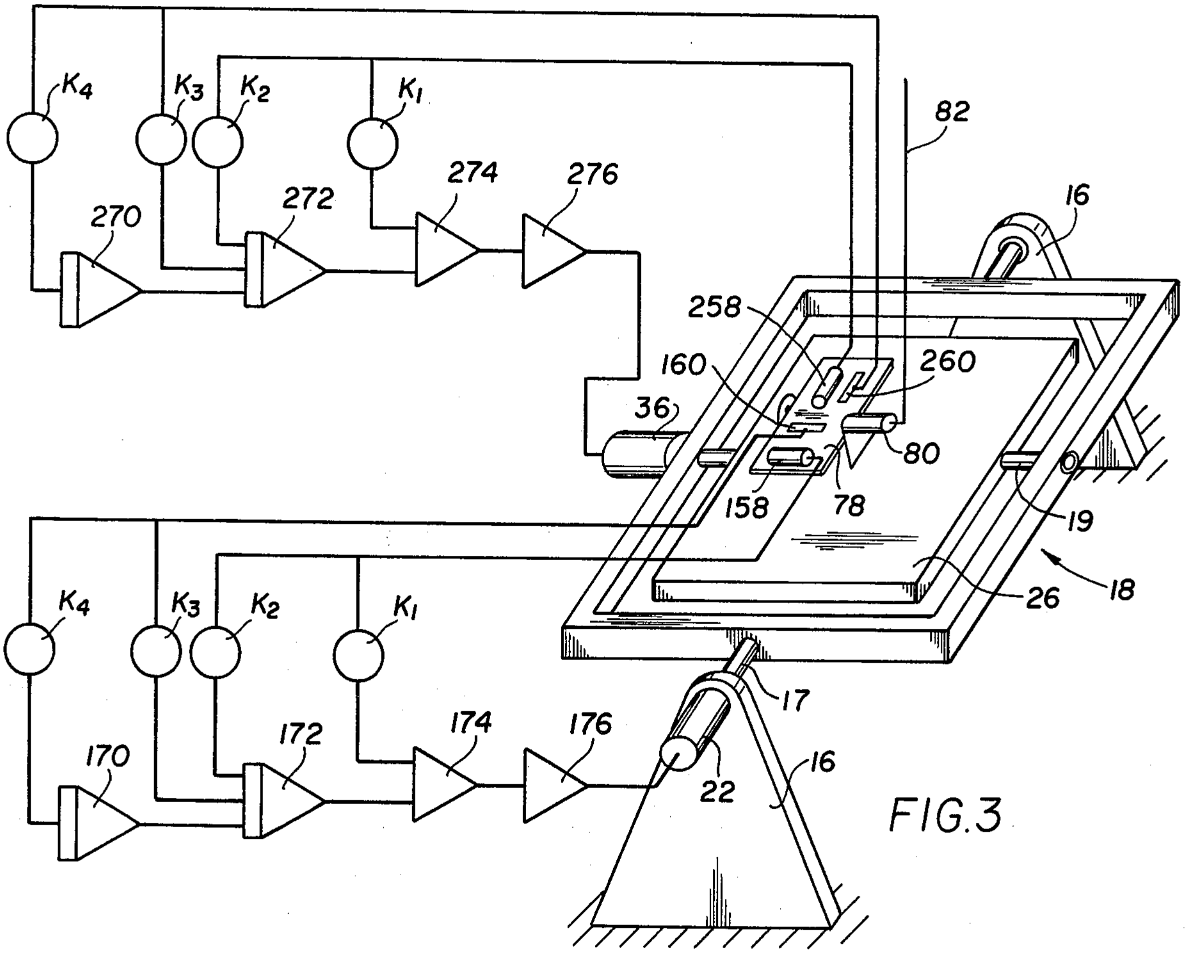
FIG. 3 shows leveling apparatus of the invention used in the antenna arrangement of FIG. 2 in a manner corresponding to that of FIG. 1.

Elements of the sensor assembly in the housing 32 are shown in FIG. 3 together with cooperating other elements of the antenna arrangement in a conventional manner. Two sets of angular rate sensors 158,258 and mercury switches 160, 260 are mounted on the carrier 26 in the housing 32 by means of a bracket 78, the carrier 26 being represented in FIG. 3 by a plate mounted on the base by means of the bearing fork 16 and the pivot member 18, shown as a conventional gimbal suspension including the shafts 17, 19 for the convenience of pictorial representation and simpler explanation.

Figure 2:
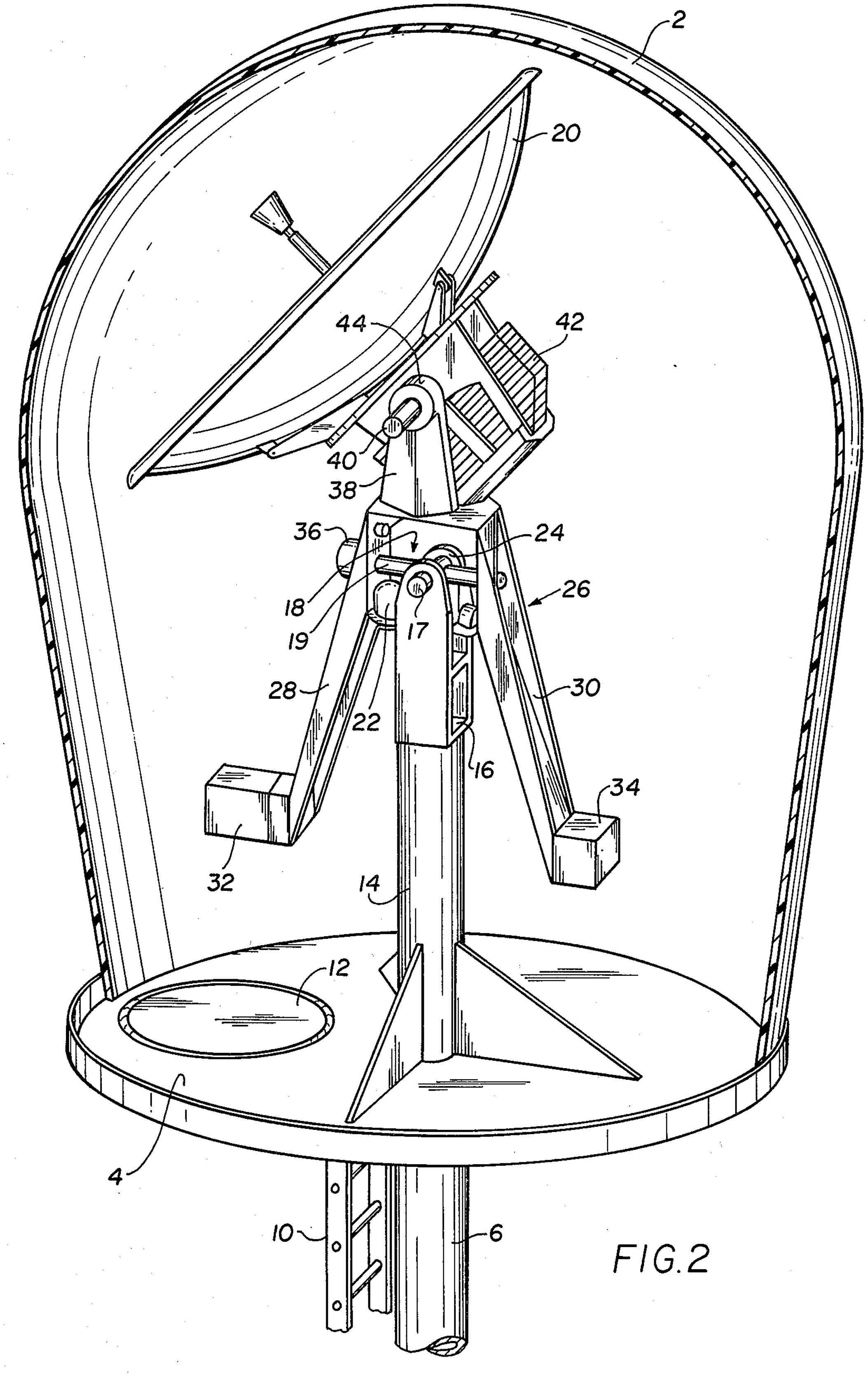
FIG. 2 is a perspective view of a satellite-tracking ship antenna arrangement incorporating units of the general type shown in FIG. 1.

As more realistically shown in FIG. 2, the shaft 17 journaled in the fork 16 may be turned by a positioning motor 22, and the shaft 19 by the motor 36. The angular rate sensor 158 and the mercury switch 160, identical structurally and functionally with the elements 58, 60 shown in FIG. 1, are arranged in respective planes perpendicular to the axis of the shaft 17, and the sensor 258 and switch 260 are elongated in planes perpendicular to the axis of the shaft 19. The bracket 78 which supports the sensors and mercury switches is mounted on the output shaft of a positioning motor 80 which is fixed on the carrier 26. The shaft of the motor 80 is parallel to the shaft 19, and the motor is controlled by a signal transmitted through a conductor 82 from the radar transmitter and receiver of which only the casing 42 is seen in FIG. 2.

The angular position of the shaft 17 is controlled by the sensor 158 and the switch 160 by means of integrating networks 170, 172, a summing amplifier 174, and a power amplifier 176 providing energizing current for the gear motor 22 in the manner described with reference to FIG. 1, the output signals of the sensor 158 and switch 160 being modified by means of adjusting circuits $k_1$ to $K_4$ as described above. The motor 22 thus tends to keep the axis of the shaft 19 horizontal.

The carrier 26 is held in a position necessary for tracking of the navigation satellite by the motor 36 cooperating with the motor 44 in a manner not itself relevant to this invention. The angular position of the carrier 26 relative to the axis of the shaft 19 is controlled by the motor 80 tilting the mercury switch 260 relative to the carrier 26 so that the carrier 26 assumes an angular position on the shaft 19 which aims the antenna 20 at the tracked satellite when the switch 260 is horizontal.

For this purpose, the output signals of the sensor 258 and the switch 260 are fed to an array of two integrating networks 270, 272, a summing amplifier 274, a power amplifier 276, and associated input adjusting circuits $K_1$ to $K_4$. The array, structurally and functionally identical with the circuitry illustrated in FIG. 1 provides energizing current for the motor 36.

It should be understood, of course, that the foregoing disclosure relates only to preferred embodiments, and that it is intended to cover all changes and modifications of the examples of the invention herein chosen for the purpose of the disclosure which do not constitute departures from the spirit and scope of the invention set forth in the appended claims.

What is claimed is:

1. Apparatus for supporting a body in a desired angular position which comprises:

(a) a base;

(b) a carrier for said body mounted on said base;

(c) electrically operated drive means operatively interposed between said base and said carrier for angularly moving said carrier relative to said base about an axis extending horizontally in the normal operating position of said apparatus; and (d) control means mounted on said carrier for controlling said drive means, said control means including (1) first signal generating means for sensing the rate of angular movement of said carrier in a plane perpendicular to said axis and for generating a first signal indicative of the sensed rate, (2) second signal generating means including position-responsive mercury switch for generating a second constant D.C. signal indicative of the absence or presence of a predetermined angular position of said switch means in a plane perpendicular to said axis, and (3) circuit means operatively connected to said first and second signal generating means and to said drive means for transmitting to said drive means an electrical operating signal in response to said first and second signals and for thereby causing said switch means to be moved by said drive means into said predetermined angular position thereof.

2. Apparatus as set forth in claim 1, wherein said operating signal satisfies the relationship $$V_{76}=k_1V_{58}+\int(k_2V_{58}+k_3V_{60}+\int\int k_4V_{60}dt)dt$$

wherein $V_{76}$ is said operating signal, $V_{58}$ and $V_{60}$ are said first and second signals respectively, and $k_1$, $k_2$, $k_3$, and $k_4$ are constants.

3. Apparatus as set forth in claim 1, wherein said predetermined position is horizontal and said second signal is zero in said predetermined position of said mercury switch.

4. Apparatus as set forth in claim 1, further comprising adjusting means for varying the angular position of said mercury switch relative to said carrier in a plane perpendicular to said axis.

5. Apparatus as set forth in claim 1, wherein said base includes a vehicle.

* * * * *